(12) United States Patent
Zai

(10) Patent No.: US 6,975,208 B2
(45) Date of Patent: Dec. 13, 2005

(54) VARIABLE ALARM FOR COMMUNICATION DEVICES

(75) Inventor: Xinyu Zai, Shanghai (CN)

(73) Assignee: Lucent Technologies Inc., Murray Hill, NJ (US)

(*) Notice: Subject to any disclaimer, the term of this patent is extended or adjusted under 35 U.S.C. 154(b) by 84 days.

(21) Appl. No.: 10/261,298

(22) Filed: Sep. 30, 2002

(65) Prior Publication Data
US 2004/0061594 A1 Apr. 1, 2004

(51) Int. Cl.[7] .............................................. G08B 1/00
(52) U.S. Cl. ...................... 340/309.16; 340/309.4; 340/309.7; 340/309.8; 340/825.22; 379/58; 379/59; 379/111
(58) Field of Search .................. 340/309.16, 309.4, 340/309.7, 309.8, 309.1, 825.22; 455/405, 455/406, 407, 408; 705/32, 52, 412, 418; 379/58, 59, 111, 112, 113; 709/218, 219

(56) References Cited

U.S. PATENT DOCUMENTS

| | | | |
|---|---|---|---|
| 5,583,933 A * | 12/1996 | Mark ..................... | 379/357.04 |
| 5,684,861 A * | 11/1997 | Lewis et al. ................ | 455/405 |
| 5,745,884 A | 4/1998 | Carnegie et al. .............. | 705/34 |
| 5,845,290 A * | 12/1998 | Yoshii ..................... | 707/104.1 |
| 6,012,086 A | 1/2000 | Lowell ..................... | 709/218 |
| 6,075,982 A | 6/2000 | Donovan et al. ........... | 455/406 |
| 6,285,749 B1 | 9/2001 | Manto ..................... | 379/114 |
| 6,292,656 B1 | 9/2001 | Donovan et al. ........... | 455/406 |
| 6,314,094 B1 | 11/2001 | Boys ..................... | 370/352 |
| 6,393,269 B1 * | 5/2002 | Hartmaier et al. .......... | 455/406 |
| 6,424,841 B1 | 7/2002 | Gustafsson ................ | 455/466 |

* cited by examiner

Primary Examiner—Hung Nguyen
(74) Attorney, Agent, or Firm—Ozer M. N. Teitelbaum

(57) ABSTRACT

An apparatus in communication with a network having a tool for tracking connect time to the network. The apparatus may be communications device, a wireless handset, a personal digital assistant, a computer laptop, a portable communications device, a wired communications terminal, and/or a calling card. The tool for tracking connect time includes a periodic alarm having an onset and a duration time. Moreover, the tool for tracking connect time also includes means for varying the onset and the duration time of at least one period of the alarm with a variable arbitration offset.

22 Claims, 2 Drawing Sheets

VARIABLE ALARM FOR COMMUNICATION DEVICES

BACKGROUND OF THE INVENTION

I. Field of the Invention

The present invention relates to a variable alarm for use with network and communication devices.

II. Description of the Related Art

Technological innovations have resulted in increasingly portable communication devices. Portable communication devices may, for example, include wireless handsets, personal digital assistants, and computer laptops. With the size, weight and power requirements of these portable communication devices diminishing, service providers have begun promoting a variety of enhanced wireless data applications, including, for example, Internet access, e-mail and m-commerce (i.e., mobile commerce). As the demand for these services is expected to proliferate, one byproduct is an anticipated increase in traffic.

To date, service providers have typically billed their customers using a combination of fixed access fees and variable charges. These variable charges may be derived from a user's connect time to a service provider's network. More particularly, a service provider may bill for each time interval (e.g., per minute) a customer accesses its network. With the emergence of wireless data applications, as well as the growing usage of calling cards (e.g., pre-paid and non-pre-paid), users may increasingly require a management tool for tracking their connect time during each billing period, and thusly, monitoring their variable charges.

Presently, some known portable communication devices (e.g., Ericsson's cellular phone model T39, and Siemens' cellular phone models 3508, 3518i and 3568) offer such a management tool for tracking connect time. Once a customer accesses a service provider's network, an alarm is fixed in time to trigger after the passage of each time interval. This periodic alarm may, for example, be realized by a tone or melody.

One notable shortcoming of these hereinabove management tools for tracking connect time is the periodic alarm. More particularly, each alarm periodically arrives no earlier than the beginning of the next time interval. As the periodic alarm may be received until essentially after the beginning of the next time interval, these known management tools fail to provide the customer with an opportunity to timely respond to the alarm—e.g., determine whether to continue or terminate accessing the service provider's network. Thusly, the customer is billed for this next time interval, at the very least, even though the purpose of the management tool for tracking connect time is to afford the customer the opportunity to promptly terminate access to the service provider's network.

Consequently, a need exists for a management tool for tracking connect time that affords the customer the opportunity to promptly terminate access to the service provider's network. Moreover, a demand exists for such a management tool that may be varied in accordance with particular parameters, including customer preferences.

SUMMARY OF THE INVENTION

The present invention provides an apparatus and method for tracking the connect time to a service provider's network, thereby affording a user with the opportunity to more promptly terminate access. More particularly, the present invention provides for an alarm having an arbitration offset, which may be varied in accordance with managing and tracking connect time to a service provider's network. In so doing, the present invention provides for a management tool that may be based on various parameters, including user preferences.

BRIEF DESCRIPTION OF THE DRAWINGS

The present invention will be better understood from reading the following description of non-limiting embodiments, with reference to the attached drawings, wherein below.

Figure 1:
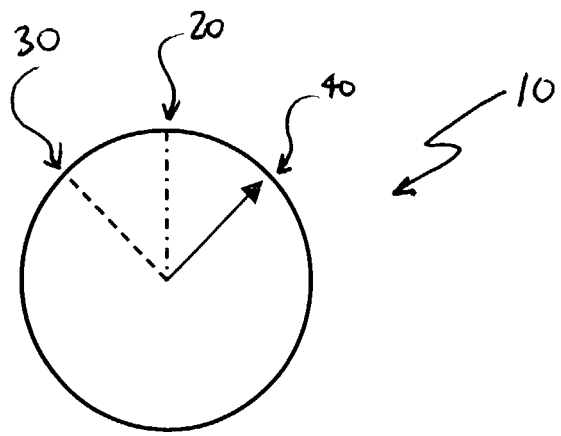
FIG. 1 depicts an embodiment of the present invention.

It should be emphasized that the drawings of the instant application are not to scale but are merely schematic representations, and thus are not intended to portray the specific dimensions of the, invention, which may be determined by skilled artisans through examination of the disclosure herein.

DETAILED DESCRIPTION

The present invention provides a scheme for tracking the connect time to a service provider's network. Consequently, the present invention affords the opportunity for a user to more promptly terminate access than in the know art. More particularly, the present invention provides for an alarm having an arbitration offset. For the purposes of the present invention, an arbitration offset is defined as a positive or negative integer than may be added to each time interval. The time interval corresponds to the original onset of the alarm, for example. The arbitration offset may be varied in accordance with managing and tracking connect time to a service provider's network. In so doing, the present invention provides for a management tool that may be based on various parameters, including user preferences.

Various scenarios may arise where a tool for managing and tracking connect time to a network may be needed. In one example, a user of a portable communication device, such as a wireless unit, may need to contact his or her home office from an overseas destination. Here, the user's connection using his/her service provider may include long distance charges as well as roaming fees. Each minute of connection, for example, may be considerably expensive. The portable communication device may alert the user by means of its alarm to the passage of each connection or billing interval (e.g., minute of connection). The alarm, however, is triggered no earlier than the end of time interval, causing the user to maintain the connection into the next time interval. As a result, the user accrues the additional unwanted charges for, at least, the next time interval. Consequently, the user may employ present invention in advance of the next time interval to allow him or her to terminate prior to accruing any additional unwanted charges associated with the next time interval.

In another example, the user may employ a pre-paid calling card with an allocated number of minutes. After each call connects the user to the Public Switched Telephone Network ("PSTN") through a service provider, the allocated number of minutes is accordingly reduced. To efficiently manage the pre-paid calling card, the user may wish for to alerted in advance that the present billing interval (e.g., minute of connection) is due to expire. Here, an offset may be programmed to trigger an alarm in advance of the passage of the present billing interval in accordance with the user's preferences. With the interval of the alarm corresponding with the billing interval, the user may select an appropriate arbitration offset to provide sufficient time to whether he or she wishes to promptly terminate access to the PSTN. It should be noted that the alarm, fixed in time and corresponding with the billing interval, might reside in the calling card using smart card technology, for example, wherein the offset is programmed into a memory component by the user. Alternatively, the fixed alarm may be generated by the service provider, which allows the user to program the offset directly.

Referring to FIG. 1, a first embodiment of the present invention is illustrated. More particularly, FIG. 1 depicts a timer 10 for characterizing each time interval in which a user of a portable communication device (not shown) is connected to a service provider's network. Each time interval has a time onset 20 on timer 10. Consequently, onset 20 may correspond with beginning of each billing interval (e.g., beginning of each minute).

In the absence of the present invention, an alarm would be triggered at an alarm trigger time 40 sometime after onset 20. More particularly, an alarm trigger time 40 would occur after timer 10 has completed at least one time interval, such as, for example, after the first billing interval (e.g., minute). Alarm trigger time 40 is shown here to occur after onset 20 because of various delays created within and/or by the portable communication device in its timely generation of the alarm. These delays may take into account various factors, including intrinsic delays to the portable communication device, as well as extrinsic delays in the portable communication device interacting with the user's service provider, for example. Presently, alarm trigger time 40, and thusly, the alarm may be triggered to occur at no earlier than time instant 20 in the absence of the present invention.

To alert the user of end of the present time interval, the portable communication device includes an arbitration offset time 30. Here, an arbitration offset may comprise a positive and/or negative integer, which the portable communication device adds with alarm trigger time 40. Advantageously, arbitration offset time 30 is shown as a negative integer. While the known art causes the alarm to trigger some time after the passage of the first time interval, the inclusion of arbitration offset time 30 affords the user the opportunity to cause the alarm to trigger at a more convenient time. More particularly, if arbitration offset 30 is negative integer, its addition to alarm trigger time 40 may trigger the alarm to occur at a time prior to onset 20 of the next time interval. By providing the alarm in advance of the prior to onset 20 of the next time interval, the user may promptly terminate access to the service provider's network before incurring any charges associated with the next time interval.

Figure 2:
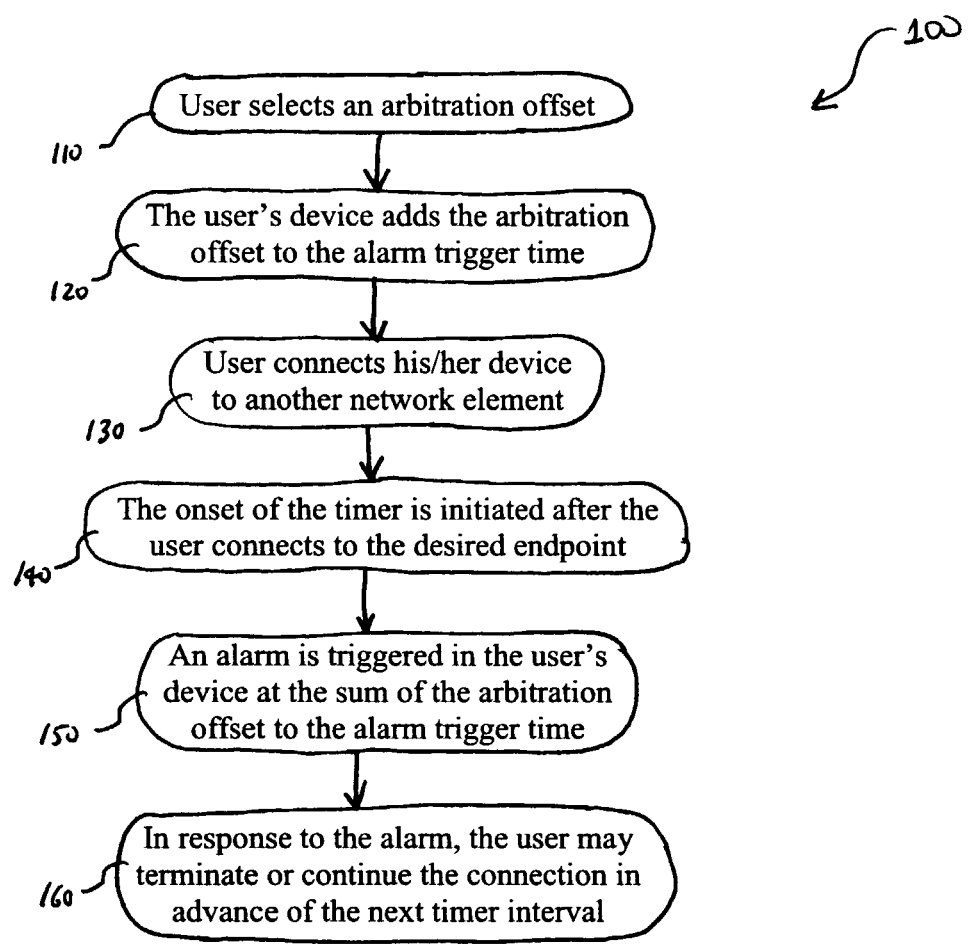
FIG. 2 depicts a flow chart of another embodiment of the present invention.

Referring to FIG. 2, another embodiment of the present invention is illustrated. More particularly, FIG. 2 depicts a flow chart 100 corresponding to a method for enabling a user to track the connect time to a service provider's network. Consequently, flow chart 100 comprises a series of detailed steps for realizing the present embodiment.

Initially, an arbitration offset for a timer is selected by a user (110). Here, the user of network element, portable communication device and/or calling card programs the arbitration offset into a memory device. The user may enter the arbitration offset into the memory device by various means, including a keyboard, keypad, handwriting interpretation device or a speech recognition device, for example.

At this point, the network element, portable communication device and/or calling card performs various calculations. One such calculation involves determining the timing of alarm. Here, the method initially adds the arbitration offset input by the user into memory with an alarm trigger time (120). The alarm trigger time, as detailed hereinbelow, is initiated at the onset of the timer.

Thereafter, the user may connect the network element, portable communication device and/or calling card to another network element (130). For exemplary purposes, this step may simply include placing a telephone call by means of a service provider, though various alternatives are contemplated hereby. The user then waits for the service provider to connect the user to the desired endpoint by means of the PSTN, for example.

Once the user is connected to the desired endpoint, the network element, portable communication device and/or calling card initiates the onset of the timer (140). The onset of the timer corresponds with the onset of the timing or billing interval. The onset of the timer may coincide in time with the initiation of the connection. However, delays may cause the initiation of the timer to occur slightly after the user is connected to the desired endpoint.

After the onset of the timer has passed, the network element, portable communication device and/or calling card triggers the alarm (150). The alarm, here, is triggered at the point in time corresponding with the sum of the arbitration offset and the alarm trigger time, as determined in hereinabove. In one example, the alarm is triggered in user's device. It should be noted that, alternatively, the alarm may be triggered at the network element connected to the user's device.

As a result of receiving the alarm in advance of the next timing or billing interval, the user may choose to terminate or continue the connection (160). This determination may be made by the user without incurring additional connect from the triggering of the alarm after the onset of the next timing or billing interval. Consequently, the user may manage and track the connect time of his/her network element, portable communication device and/or calling card to the service provider's network.

Figure 3:
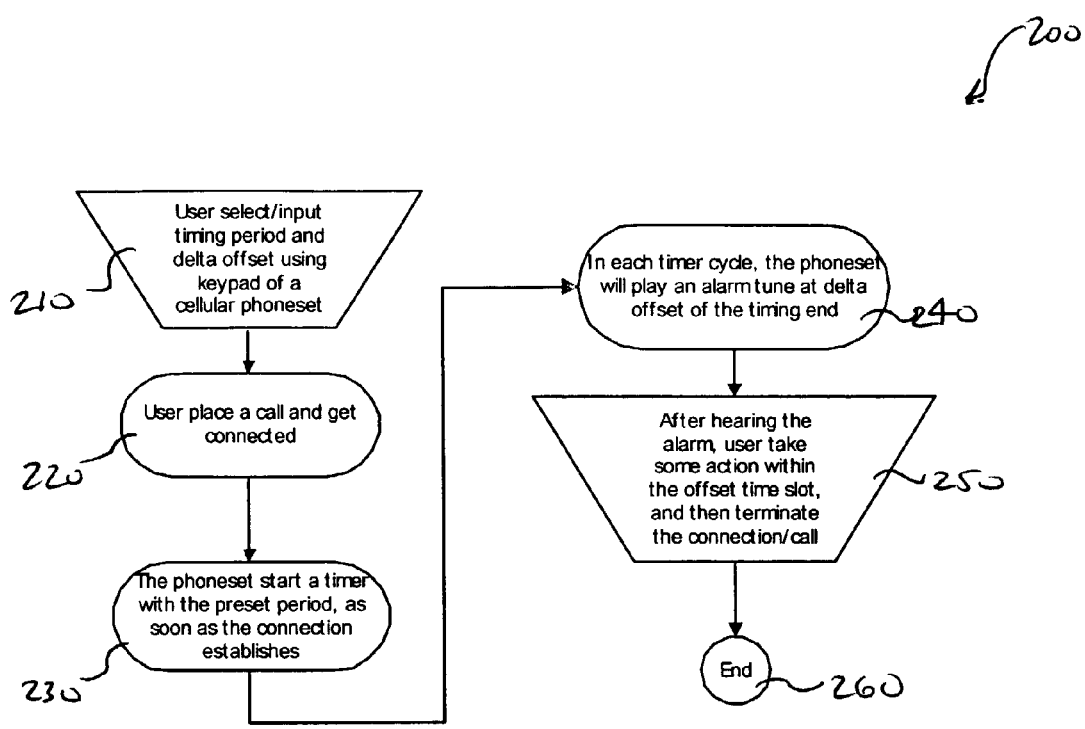
FIG. 3 depicts a flow chart of another embodiment of the present invention.

Referring to FIG. 3, yet another embodiment of the present invention is illustrated. FIG. 3 depicts a flow chart 200 corresponding to another method for enabling a user to track the connect time to a service provider's network. Much like flow chart 100, flow chart 200 comprises a series of detailed steps for realizing the present embodiment.

Initially, the user selects a timing period and delta or arbitration offset (210). Here, the user of a portable communication device programs the arbitration offset into a memory device. The user may enter the arbitration offset into the memory device by various means, including a keyboard, keypad and/or handwriting interpretation device, for example.

Thereafter, the user may choose to place a telephonic voice or data call using the portable communication device (230). For exemplary purposes, this step may simply include placing a telephone call by means of a service provider, though various alternatives are contemplated hereby. The user then waits for the service provider to connect the user to the desired endpoint by means of the PSTN, for example.

Once the user is connected to the desired endpoint of the telephonic voice or data call, the portable communication device initiates the preset timing period (240). The initiation of the preset timing period corresponds with the onset of the timing or billing interval. The onset of the timer may coincide in time with the initiation of the connection. As noted hereinabove, delays however may cause the initiation of the timing period to occur slightly after the user is connected to the desired endpoint.

Subsequently, the passage of each timing period causes the user's portable communication device to play the alarm using the arbitration offset. Here, the method initially adds the arbitration offset input by the user into memory to the alarm trigger time (240). The alarm trigger time, as detailed hereinabove, is initiated at onset of the timing period. It should be noted that this calculation is performed earlier in the method by the portable communication device and executed at the time the portable communication device the telephonic voice or data call is connected. The point in the method in which this step is executed corresponds with identifying the onset of timing period, for example. It should be noted that in one example, the alarm is triggered in user's device. It should be noted that, alternatively, the alarm may be triggered at the network element connected to the user's device.

As a result of receiving the alarm in advance of the next timing or billing interval, the user may make a determination (250). Here, the user may choose to terminate or continue the connection, and the method concludes (260). This determination may be made by the user without incurring additional connect from the triggering of the alarm after the onset of the next timing or billing interval. Consequently, the user may manage and track the connect time of his/her portable communication device to the service provider's network.

By the hereinabove methods, the onset of the alarm may be varied by introducing the arbitration offset into a memory device. As the alarm may be periodic, the arbitration offset provides the user with a signal period to the next billing interval. The arbitration offset may realize employed in at least one alarm reminder, though it may be advantageous to provide the user with signaling reminder in advance of each upcoming billing interval. Thusly, the signal affords the user the opportunity to terminate or continue for each billing interval throughout the connection.

It should be noted that the tool for managing and tracking connect time to a network of the present invention may be implemented in hardware. For example, a user's network element, portable communication device and/or calling card may include an alarming device for generating an alarm. The alarm may be a tone, melody and/or a visual signal. As stated hereinabove, the onset of the timer is initiated upon or about the time the user connecting to the service provider's network or the like. The user's network element, portable communication device and/or calling card, thusly, comprises a timer for timing the connect time and a memory device for storing this onset time. The memory device also stored the arbitration offset and is coupled with a processing unit for adding the arbitration offset and the onset of the timer, which may be the alarm trigger time.

Moreover, the arbitration offset may provide an alternate cue to the user. In this example, the onset of the alarm as a result of the arbitration offset creates a first tone, melody and/or a visual signal. At any point during the period in which the alarm is active, including at the end of this period, a second tone, melody and/or a visual signal may be generated by the user's network element, portable communication device and/or calling card. The visual signals may be distinct from one another by varying having differing intensities and/or wavelengths. Alternatively, these visual signals may appear as icon(s) on a display of the user's network element, portable communication device and/or calling card.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the portable communication device, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

What is claimed is:

1. An apparatus in communication with a network, the apparatus comprising:
a tool for tracking connect time to the network, the tool comprising:
means for generating an alarm having an onset; and
an arbitration offset for varying an onset of the alarm, the arbitration offset comprising a positive integer or a negative integer.

2. The apparatus of claim 1, wherein the alarm is periodic and the arbitration offset varies a duration of at least one period of the alarm.

3. The apparatus of claim 2, wherein the alarm is generated no later than at a beginning of a next access time interval, the arbitration offset varies the onset of the alarm to before an end of an initial access time interval, and the initial access time interval occurs prior to the next access time interval.

4. The apparatus of claim 2, wherein the alarm comprises at least one of a first tone, a first melody and a first visual signal.

5. The apparatus of claim 4, wherein the arbitration offset generates at least one of a second tone, a second melody and a second visual signal.

6. The apparatus of claim 4, wherein the arbitration offset alters at least one of an intensity and a wavelength of the first visual signal.

7. The apparatus of claim 2, wherein the apparatus is at least one of a communications device, a wireless handset, a personal digital assistant, a computer laptop, a portable communications device, a wired communications terminal, and a calling card.

8. The apparatus of claim 7, wherein the arbitration offset is programmed into a memory using at least one of a keypad, a keyboard, a handwriting interpretation device, and a speech recognition device.

9. A method comprising:
   providing an alarm having an onset for tracking connecting time of a communication device to a network; and
   varying the onset of the alarm with an arbitration offset, the arbitration offset comprising a positive integer or a negative integer.

10. The method of claim 9, wherein the alarm is periodic, and further comprising:
    varying a duration of at least one period of the alarm with the arbitration offset.

11. The method of claim 10, wherein the alarm is periodic and is provided no later than a beginning of a next access time interval, the arbitration offset varies the onset of the alarm to before an end of an initial access time interval, and the initial access time interval occurs prior to the next access time interval.

12. The method of claim 11, wherein providing an alarm comprises generating at least one of a first tone, a first melody and a first visual signal.

13. The method of claim 12, wherein varying an onset of the alarm with an arbitration offset comprises generating at least one of a second tone, a second melody and a second visual signal.

14. The method of claim 12, wherein varying an onset of the alarm with an arbitration offset comprises altering at least one of an intensity and a wavelength of the first visual signal.

15. A portable communications device comprising:
    a tool for tracking connect time to a network comprising:
      a periodic alarm having an onset and a duration time; and
      means for varying the onset and the duration time of at least one period of the alarm with a variable arbitration offset, the variable arbitration offset comprising a positive integer or a negative integer.

16. The portable communications device of claim 15, wherein the onset of the alarm is no later than a beginning of a next access time interval, the variable arbitration offset varies the onset of the alarm to before an end of an initial access time interval, and the initial access time interval occurs prior to the next access time interval.

17. The portable communications device of claim 16, wherein the alarm comprises at least one of a first tone, a first melody and a first visual signal.

18. The portable communications device of claim 17, wherein the variable arbitration offset generates at least one of a second tone, a second melody and a second visual signal.

19. The portable communications device of claim 17, wherein the variable arbitration offset alters at least one of an intensity and an wavelength on the first visual signal.

20. The portable communications device of claim 17, wherein the portable communications device is at least one of a wireless handset, a personal digital assistant, and a computer laptop.

21. A method of communicating, comprising:
    determining an amount of usage of a wireless communication network;
    generating an alarm indicating when the amount of usage has passed a selected threshold, the alarm having an onset corresponding to an end of a current billing increment and a beginning of a subsequent billing increment; and
    altering the onset of the alarm using an arbitration offset that causes the onset of the alarm to occur at a selected time preceding or following the end of the current billing increment.

22. The method of claim 21, wherein the arbitration offset comprises an integer.

* * * * *